UNITED STATES PATENT OFFICE.

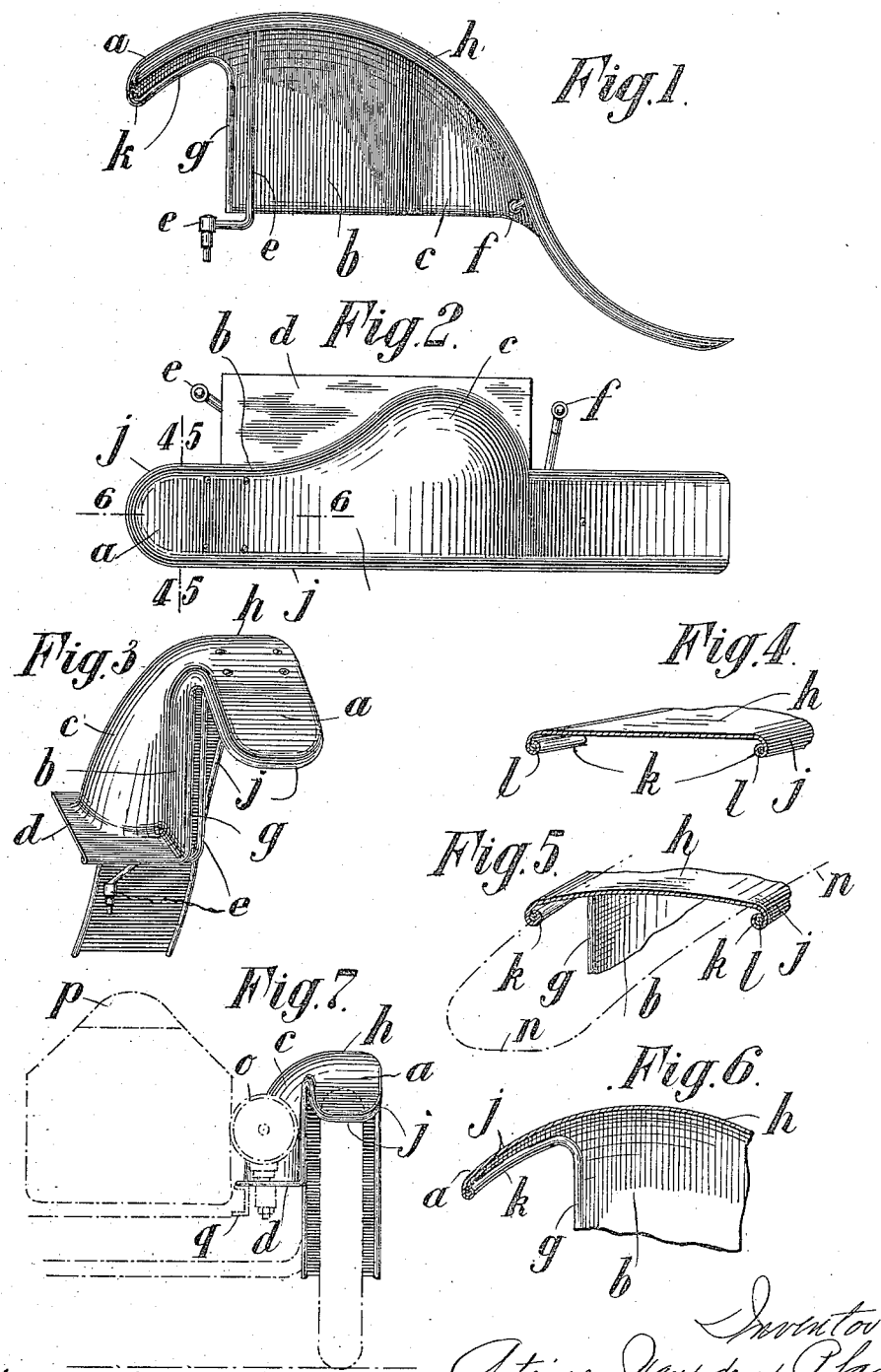

ANTOINE VAN DEN PLAS, OF BRUSSELS-CINQUANTENAIRE, BELGIUM.

MUD-GUARD FOR MOTOR-VEHICLES.

1,167,449.        Specification of Letters Patent.        Patented Jan. 11, 1916.

Application filed September 16, 1912, Serial No. 720,665. Renewed October 5, 1915. Serial No. 54,258.

*To all whom it may concern:*

Be it known that I, ANTOINE VAN DEN PLAS, a subject of the King of Belgium, residing at 32 Rue St. Michel, Brussels-Cinquantenaire, Kingdom of Belgium, have invented new and useful Improvements in Mud-Guards for Motor-Vehicles, of which the following is a specification.

The object of the present invention is an improved construction of iron mudguard for the body of motor vehicles, more particularly adapted for the front guards.

The purpose of the new arrangement is to separate the body of the guard from the vehicle so as to leave a greater space between the side member of the chassis (or the bonnet of the engine) and the descending wall of the guard than was possible in mudguards used hitherto, without interfering with the turning of the vehicle wheels for steering. This greater free space thus obtained enables the lamps or projectors of the vehicle to be mounted besides the vehicle so that they are farther apart, and they can be set farther back so as not to project beyond the plane of the front of the radiator and not to come into the way of the driver working the starting handle. Besides these technical advantages presented by the new construction of mudguard it has the advantage of a bolder and more elegant appearance.

By way of example a form of construction of the new mudguard is shown in the accompanying drawing, in which—

Figure 1 is a side elevation of the guard locked at slightly from below. Fig. 2 is a plan view. Fig. 3 is a three-quarter perspective view of the guard from the front on the side turned toward the chassis, which shows particularly the bulge or projection of the guard at the rear which allows of rotation of the wheel. Fig. 4 is a transverse section of the body of the guard on the line 4—4 of Fig. 2. Fig. 5 is a view similar to that of Fig. 4 of a guard which is domed in the middle. Fig. 6 is a detail section on the line 6—6 of Fig. 2. Fig. 7 shows a front view of the guard arranged above a vehicle wheel so as to leave between its vertical surface and the engine radiator a sufficient space to receive a lamp.

At the front the guard has a rounded beak $a$. The periphery of this beak and the whole edge on the outer side of the body $h$ is curved inwardly as indicated at $j$. The body $h$ may be flat (Fig. 4) or domed (Fig. 5). The edge of the incurved portion $j$ forms a roll $k$ around a stiffening member 1 inside the guard. On the inner side behind the beak $a$ the incurved edge $j$ is continued along a descending wall $b$ which is vertical or slightly inclined as shown in Fig. 3, and which extends to the level of the upper surface of the side member of the chassis (Fig. 7). A little farther back this descending wall is prominently domed or bulged at $c$ toward the chassis so as to enable the wheel beneath the guard to be turned outward. This wall which is partially plane at $b$ and partially domed at $c$ is folded inward horizontally at its lower part so as to form a screen $d$, the edge of which is intended to abut upon or against the upper surface of the side member $a$ of the chassis (Fig. 7). The screen $d$ thus forms a horizontal mudguard to protect the vacant space between the wall of the guard and the bonnet of the engine.

Behind the bulge $c$ (Fig. 2) the body $h$ has again an incurved edge $j$ the extremity $k$ of which is rolled around a strengthening member 1 as indicated in Figs. 4 and 5. The front edge $g$ of the wall $b$ also has its edge rolled around a strengthening member, this roll being the continuation of the roll $k$ of the beak.

The line $n$ shown in dot-and-dash lines in Fig. 5 indicates the outline of the body of the guard at its beak portion, the incurved edge which extends around this outline may be regarded as formed by a generatrix like the spiral line $j\ k$ in a plane at right angles to the line $n$ moving along this line $n$ as a directrix and remaining at right angles to it.

Fig. 7 shows how the new arrangement of mudguard with narrowed front portion enables a lamp or projector $c$ to be arranged between the plane portion $b$ and the radiator, this lamp being set back so that it does not project beyond the face of the radiator and therefore cannot interfere with the manipulation of the starting handle.

Brackets such as $e\ f$ secured to the under surface of the guard terminate in bolts which fit attachments secured upon the side member $q$ of the chassis and rigidly support the mudguard.

Having now particularly described and ascertained the nature of my invention and in what manner the same is to be performed, I declare that what I claim is:

A mudguard for vehicles comprising a body portion arranged to cover the upper portion of a wheel and having a portion of its inner side bulged toward the vehicle, said body portion and bulge being provided with a lateral flange extending from the lower inner edge of the body toward the vehicle to fill the space between the body portion and the body of the vehicle.

In testimony whereof I affix my signature in presence of two witnesses.

ANTOINE VAN DEN PLAS.

Witnesses:
GASTON MAEZ,
CHAS. ROY NASMITH.

Copies of this patent may be obtained for five cents each, by addressing the "Commissioner of Patents, Washington, D. C."